US007018291B1

(12) United States Patent
Lemke et al.

(10) Patent No.: US 7,018,291 B1

(45) **Date of Patent: *Mar. 28, 2006**

(54) PLAYER TRACKING SYSTEM FOR GAMING TABLES

(75) Inventors: Michael L. Lemke, Henderson, NV (US); Ray Frankulin, Henderson, NV (US)

(73) Assignee: Station Casinos, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/690,099

(22) Filed: Oct. 20, 2003

Related U.S. Application Data

(63) Continuation-in-part of application No. 09/452,556, filed on Dec. 1, 1999, now Pat. No. 6,672,589.

(51) Int. Cl.
*A63F 13/00* (2006.01)

(52) U.S. Cl. .......................................................... 463/12

(58) Field of Classification Search ............ 463/11–13, 463/17, 18, 19, 25, 30, 31, 37; 273/236, 273/149 R, 292, 309

See application file for complete search history.

(56) References Cited

U.S. PATENT DOCUMENTS

| | | | | |
|---|---|---|---|---|
| 5,472,194 | A | | 12/1995 | Breeding et al. |
| 5,586,936 | A | | 12/1996 | Bennett et al. |
| 5,613,912 | A | | 3/1997 | Slater |
| 5,735,742 | A | | 4/1998 | French |
| 5,775,993 | A | | 7/1998 | Fentz et al. |
| 5,779,546 | A | * | 7/1998 | Meissner et al. ............. 463/25 |
| 5,809,482 | A | * | 9/1998 | Strisower ..................... 705/30 |
| 5,957,776 | A | | 9/1999 | Hoehne |
| 6,004,205 | A | | 12/1999 | Lauretta et al. |
| 6,164,652 | A | | 12/2000 | Lauretta et al. |
| 6,626,433 | B1 | * | 9/2003 | Scibetta ...................... 273/292 |
| 6,672,589 | B1 | * | 1/2004 | Lemke et al. ............... 273/236 |
| 2002/0039921 | A1 | * | 4/2002 | Rowe et al. .................. 463/25 |

* cited by examiner

*Primary Examiner*—Kim Nguyen
(74) *Attorney, Agent, or Firm*—Brian N. Young; Townsend and Townsend and Crew LLP

(57) ABSTRACT

A system for tracking players at a gaming table that includes a plurality of player positions and for displaying information related to the players. The system includes a central computer, a display monitor, a card reader and an input device. The system correlates where players are seated and displays their positions along with their first names and other desirable information related to the players. The system may be used to track regulatory compliance rules for a player.

21 Claims, 10 Drawing Sheets

PLAYER TRACKING SYSTEM FOR GAMING TABLES

CROSS-REFERENCE TO RELATED APPLICATIONS

This application is a continuation-in-part of U.S. non-provisional patent application Ser. No. 09/452,556, filed Dec. 1, 1999, issued as U.S. Pat. No. 6,672,589, the entire disclosure of which is incorporated herein by reference in its entirety for all purposes.

BACKGROUND OF THE INVENTION

1. Field of the Invention

The present invention relates to a tracking system for tracking players at a gaming table, and more particularly, to an automated player tracking system that provides a dealer with player information at player positions at the gaming table.

2. Description of the Prior Art

In the ever increasing competition among casinos to attract and retain players' loyalty, casinos generally award them with complimentary services and merchandise, which are generally referred to as "comps." Comps are similar to frequent flyer miles and are generally earned on the basis of the amount of money wagered by the player. Generally, comps are calculated on the basis of the theoretical win for the casino (or loss for the player), which in turn depends on the odds of the game and how much was wagered by the player. The theoretical win is generally fairly easy to calculate for slot machines due to their automation and ability to count each coin that is inserted and dispersed.

With table games, it is more difficult to calculate the theoretical win because bets change hands instead of being inserted into coin slots. Thus, in order to keep exact track of a player's gambling at table games, one has to capture the size of each bet and the frequency of the bets, or the number of bets per unit of time. This is typically too burdensome for casinos to do and therefore, casinos generally estimate a player's bets on the basis of the lower table betting limit and then adjusting the player's bets if the player regularly bets more, along with the speed of the game, (number of games per hour, for example). The theoretical win is then calculated on the basis of the approximate amount bet by the player and the odds for the game.

Comps have become a big point of attraction for casinos and, among other things, generally include the "free" luxury suites and similar "perks" casinos generally offer their "high roller" customers, to more mundane rewards such as free meals, merchandise, etc. offered to others. One player who walks away with a large win (resulting with a corresponding high loss to the casino) will receive the same comps as another player who incurs a loss (resulting in a win for the casino) where the two players play the same game and wager the same amount of money. Comps are often provided to players who win large amounts of money in order to entice them to remain at the casino in order to provide the casino with opportunities to win back some or all of the winnings.

Lately, major casinos including those with multiple properties, tend to issue a card to each player. This card typically has a magnetic strip that carries an ID or account number for the player as well as other relevant information. On slot machines, the player generally inserts his card into a reader attached to or incorporated in the machine and thus, all coins dropped by the player are credited to his account from which the theoretical win of the casino is calculated and then credited to the player's account at a central computer. Recently, large casinos have begun to implement multi-property wide systems where a player's gaming activity in any properties of the casinos is tracked and stored in a central account that is accessible from all casino properties.

In order to encourage players at gaming tables to remain at the table and gamble, dealers are often encouraged to strike up conversations with the players and generally be friendly with the players. This helps players feel comfortable and increases the amount of fun the players have at the table. Thus, it is beneficial for the dealers to know as much about the players on a personal level as possible in order to allow them to more easily engage in conversation with the players.

In some areas, regulatory compliance rules are required for casinos. The compliance rules require the casino to perform certain functions based on the rules.

Accordingly, methods and apparatus that allow a casino to track regulatory functions that need to be performed are desired.

BRIEF SUMMARY OF THE INVENTION

A system for tracking play at a gaming table that includes a plurality of player positions, in accordance with the present invention, includes a computer database and a single card reader adjacent a dealer position at the gaming table. The card reader is coupled to the computer database with a communication channel. A display monitor adjacent the dealer position at the table is provided that is coupled with the computer database with a communication channel and is configured to depict player positions at the gaming table. An input is coupled to the display monitor for associating a card read by the card reader with a respective player position at the table. The respective player position that is depicted by the display monitor indicates a player associated with the card read by the card reader at the respective player position.

In accordance with one aspect of the present invention, the system is configured such that the display monitor displays information associated with a player at a respective player position, either upon request or automatically.

The present invention provides a method of tracking players at gaming table that includes a plurality of player positions that include receiving a card from a player at one of the player positions, reading player information from the card with a card reader adjacent a dealer position, depicting player positions on a display adjacent the dealer position, and inputting a respective player position on the display associated with the card and the player thus indicating at which player position the player is located.

Accordingly, the present invention allows a dealer to input information from a card from a player and correlate the information contained on the card and read by the card reader with a player position. By observing a display monitor, the dealer can keep track of which players are at which player positions, and engage them in conversation by their names. This can provide a more congenial and fun atmosphere for the players, thereby encouraging them to remain at the gaming table and continue to wager money.

Furthermore, a system and method in accordance with the present invention, allows dealers and pit bosses to obtain and update information regarding players and their playing and wagering habits.

In one embodiment, a method of tracking players at gaming tables that include a plurality of player positions is provided. The method comprises: receiving a card from a player at one of the player positions; reading player information from the card with a card reader; depicting player positions on a display; inputting a respective player position on the display associated with the card and the player thus indicating at which player position the player is located; and determining a regulatory function that is required based on regulatory compliance rules for the player.

In another embodiment, a method of tracking players at gaming tables that include a plurality of player positions is provided. The method comprises: depicting player positions on a display adjacent the dealer position; inputting a respective player position on the display for an uncarded player thus indicating at which player position the player is located; and determining a regulatory function that is required based on regulatory compliance rules for the uncarded player.

In yet another embodiment, a system for tracking play on a gaming table that includes a plurality of player positions is provided. The system comprises: a computer database; a card reader, the card reader being coupled to the computer database with a communication channel; and a display monitor, the display monitor being coupled to the computer database with the communication channel, the display monitor being configured to depict player positions where players are physically positioned at the table, wherein the display monitor comprises a touchscreen for associating a card of a player being read by the card reader with a respective player position of the player at the table upon a touching of the respective player position depicted on the touchscreen, the respective player position depicted by the display monitor indicating the player associated with the card read by the card reader; and a regulatory module configured to perform a regulatory function for the player that is associated with the card based on regulatory compliance rules.

In another embodiment, a system for tracking play on a gaming table that includes a plurality of player positions is provided. The system comprises: a computer database; a display monitor adjacent the dealer position at the table, the display monitor being coupled to the computer database with the communication channel, the display monitor being configured to depict player positions where players are physically positioned at the table, wherein the display monitor comprises a touchscreen for associating an uncarded player with a respective player position of the uncarded player at the table upon a touching of the respective player position depicted on the touchscreen, the respective player position depicted by the display monitor indicating the uncarded player at the table; and a regulatory module configured to perform a regulatory function for the uncarded player that is associated with the card based on regulatory compliance rules.

Other features and advantages of the present invention will be understood upon reading and understanding the detailed description of the preferred exemplary embodiments, found herein, in conjunction with reference to the drawings, in which like numerals represent like elements.

DETAILED DESCRIPTION OF THE INVENTION

Figure 1:
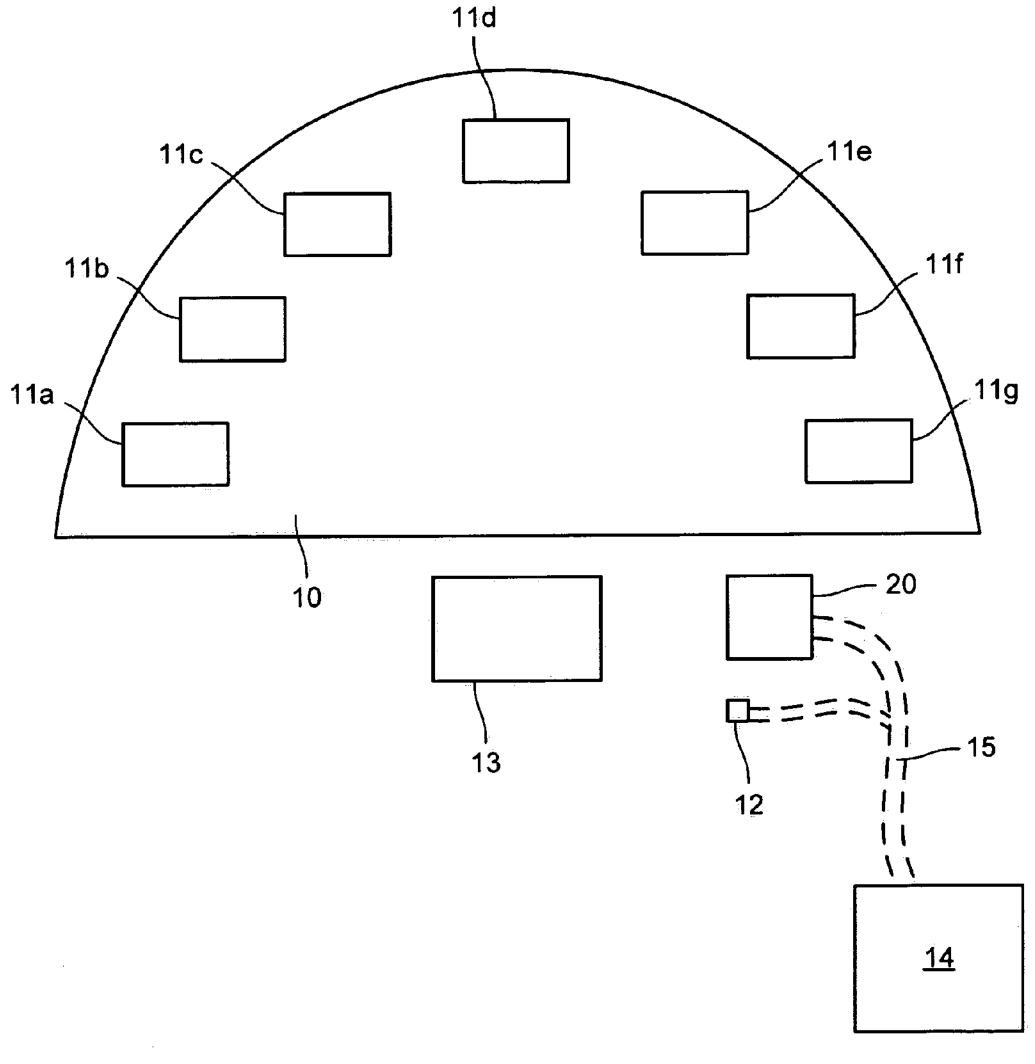
FIG. 1 is a schematic illustration of a blackjack gaming table.

A blackjack gaming table 10 is illustrated in FIG. 1. While the present invention will be described with reference to blackjack as the example game, it will be apparent to those skilled in the art that the present invention is useful for table games such as, for example, blackjack, poker, roulette, craps, and the like.

A typical blackjack table generally includes seven player positions 11*a*–11*g*. A system for tracking play of players at the blackjack table, as well as providing information pertaining to the players, includes a card reader 12 located adjacent a dealer position 13. The card reader may be any type that is capable of reading or obtaining information from cards issued by the casino, such as, for example, a magnetic reader for reading magnetic stripes on cards, an electronic card reader for reading electronic cards, and a port for receiving electronic keys.

The card reader is coupled to a central computer 14 via a communication channel 15, such as, for example, cables, wires, fiber optics, radio waves, etc. The central computer will keep track of the various players' accounts. Each player's account may include player information, such as, for example, the player's account number, the player's name, the wife's name, birthdays, anniversaries, etc.

Figure 2:
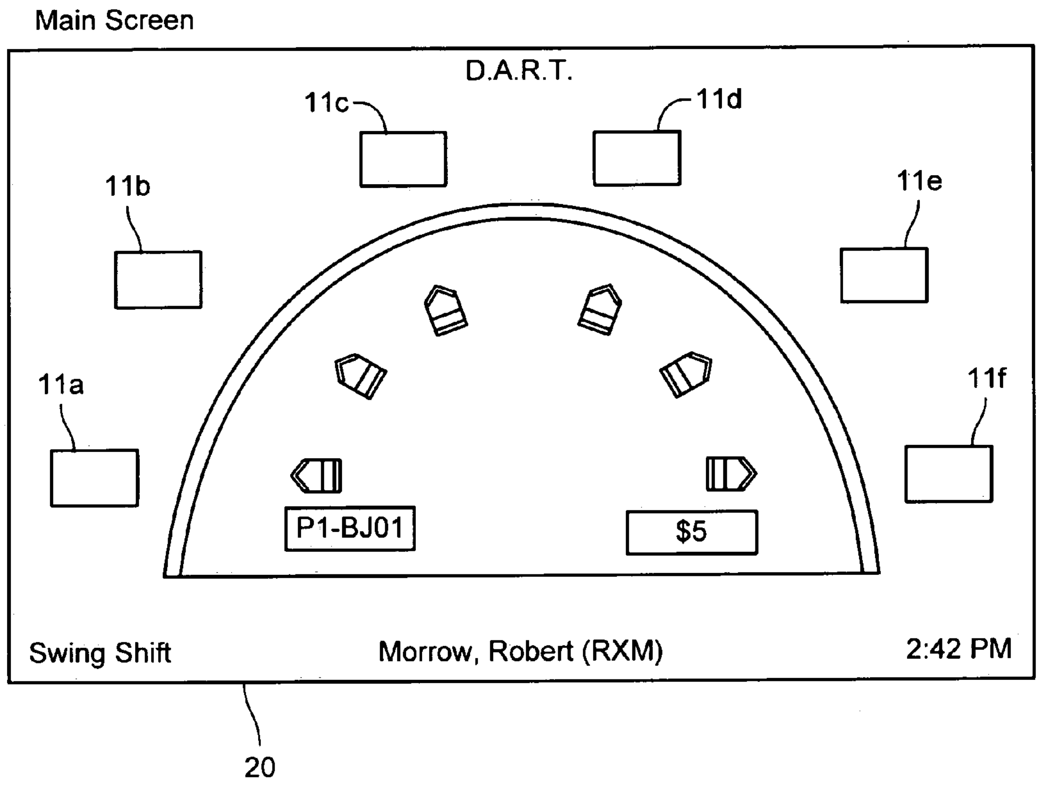
FIG. 2 is a schematic illustration of a display on a display monitor in accordance with the present invention.

The system further includes a display monitor 20. While a game is being played, the display monitor displays a picture of blackjack table 10, including all player positions 11, as illustrated in FIG. 2. Thus, after a card is read by the card reader, the dealer touches the respective player position where the player whose card has just been read is seated, thus associating the table position of the new player with the new player. Preferably, the display monitor then displays the player's name adjacent his position at the table. In a preferred embodiment, display monitor 20 includes a touch screen so that information may be input through the touch screen.

Additionally, the system may include other input devices (not shown) such as, for example, a keyboard, a mouse, and a microphone.

Figure 3:
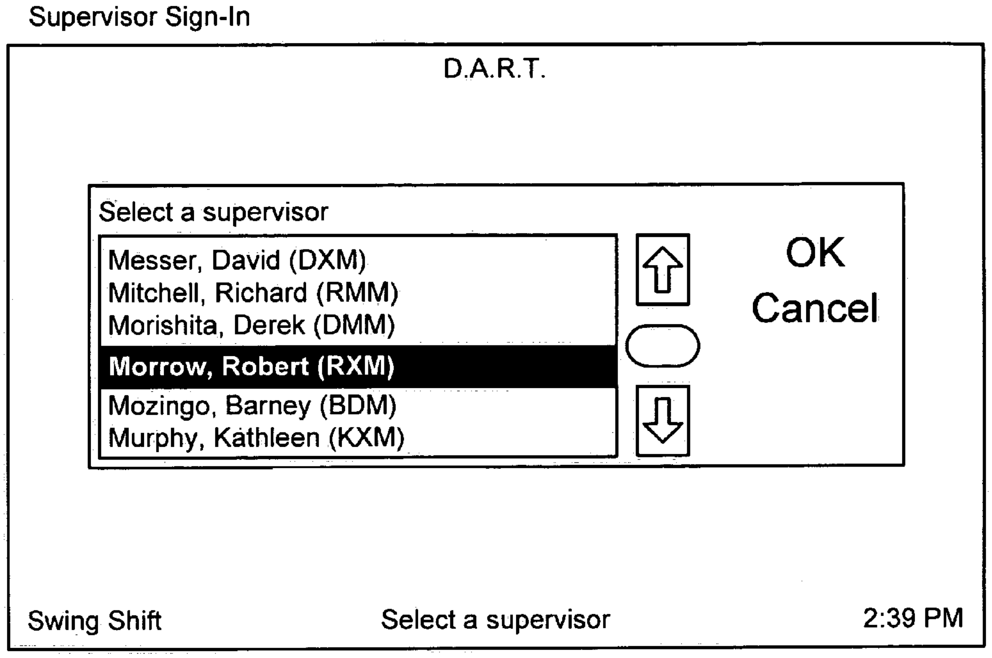
FIG. 3 is another schematic illustration of a display on a display monitor in accordance with the present invention.
Figure 4:
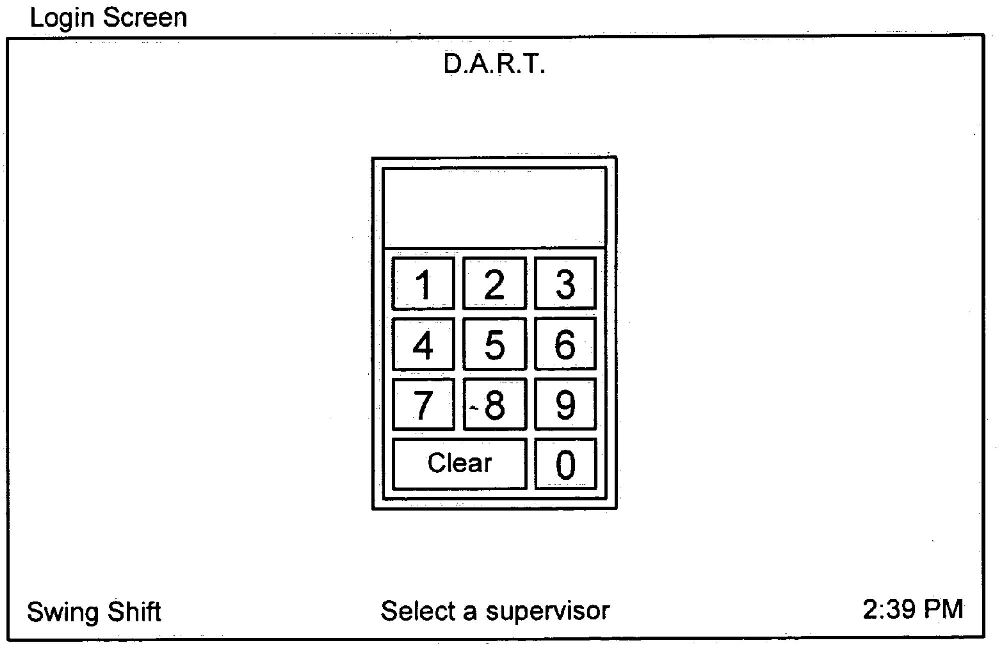
FIG. 4 is another schematic illustration of a display on a display monitor in accordance with the present invention.

In a preferred embodiment, operation of the system begins with a sign-in process. When first opening a game, a shift supervisor, or other authorized personnel, activates the system, preferably by touching the screen of the display monitor, thus turning off any screen saver present in the system. Preferably, a list of supervisors appears on the screen, as illustrated in FIG. 3, and the supervisor selects his or her name from the list. The supervisor is prompted for their individual password in order to open the game, which the supervisor provides to the system, via a screen that, for example, is similar to one illustrated in FIG. 4. The supervisor verifies that the table minimum is correct, and preferably the table maximum, and if not, changes the table setting for that game in order to reflect the actual table limits. Once the game is ready for play, the dealer assumes his position at the dealer position and players walk up to the table and present their identification devices or cards to the dealer, who then has reader 12 read them. The dealer may either keep the card or may immediately return it to the player. If the dealer keeps the card, he will obviously present it to the player when he is finished playing and wishes to leave. With such an arrangement, the dealer may, if desired, have the system re-read the card with the card reader thus signifying that the player is leaving.

Figure 5:
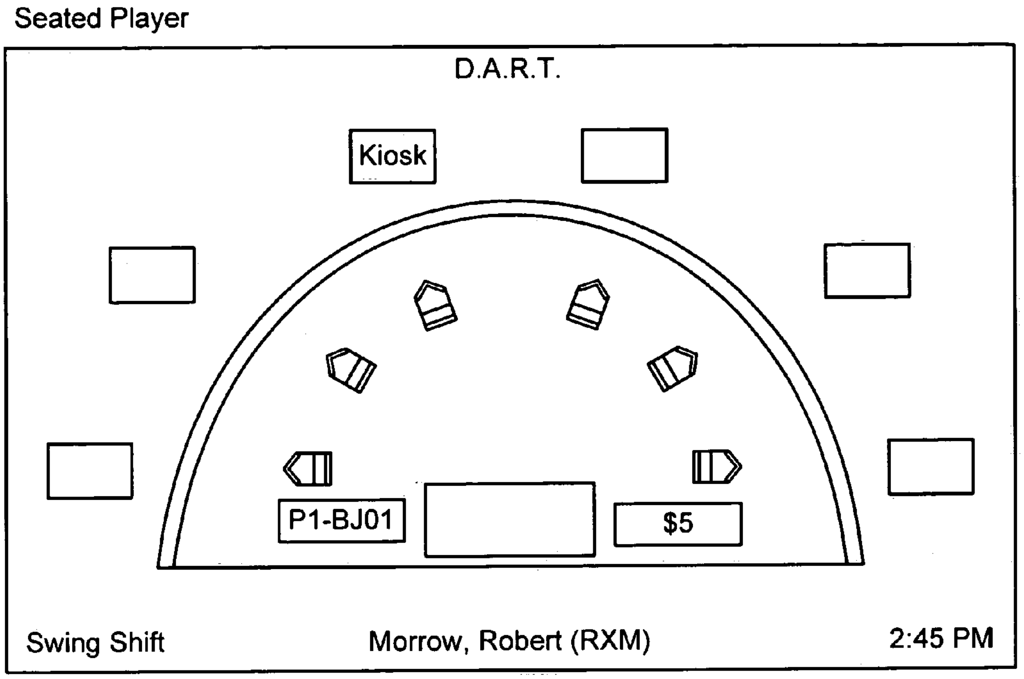
FIG. 5 is another schematic illustration of a display on a display monitor in accordance with the present invention.

After the card has been read by the card reader, the dealer inputs into the system the player position at the gaming table. As noted previously, preferably display monitor 20 is a touch screen monitor, and thus, the dealer merely touches the screen at the corresponding player position depicted thereon to indicate where the player whose card has just been read is seated. Preferably, after the dealer has input the player position at the table, the corresponding player position on the display monitor will display the player's first name, as illustrated in FIG. 5.

Preferably, central computer 14 returns information that preferably may include the player's name, any "secondarys" on the player's account (for example, his spouse), a host code corresponding to who is hosting the player (if a party is indeed hosting the player), any amount of comp dollars available, the player's birthday or anniversary, the last comp date, i.e. the last time the player was comped, and any points accumulated for any promotions or competitions with which the player is involved. This information is preferably displayed in a manner similar to that which is illustrated in FIG. 6.

Preferably, the system allows for the supervisor to enter information any time a player buys-in for his initial playing chips or whenever the player buys-in for more playing chips. Additionally, the system preferably allows the supervisor to enter the amount of chips in front of the player at various stages of the time the player spends at the playing table. Also, information is preferably input relating to the player's average bet.

Figure 6:
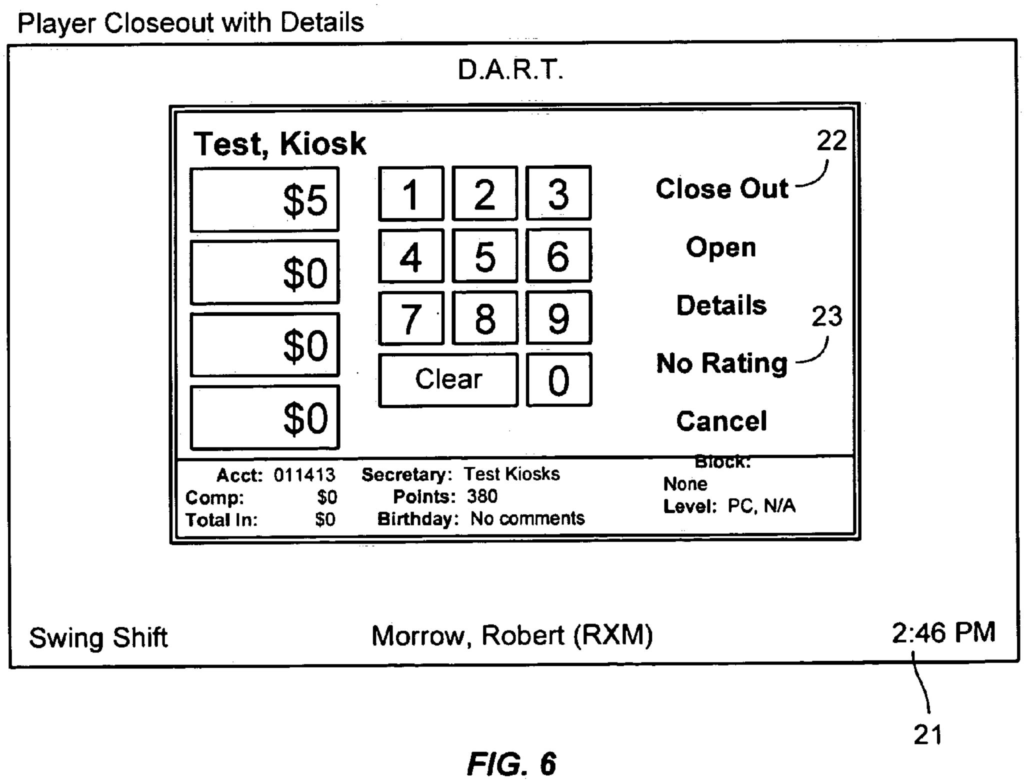
FIG. 6 is another schematic illustration of a display on a display monitor in accordance with the present invention.

As noted in FIG. 6, the system preferably includes a details key 21 on the touch screen. Such a key can be located on another input type-device if a touch screen is not used. By pressing this key, details about the player, as outlined above, may be displayed. Thus, the system may be configured to automatically display details about the player, or only display the details upon request, or both.

When a player is finished playing and wishes to leave, a "check-out" operation is preferably performed. During the check-out procedure, the supervisor preferably verifies the average bet, the speed of play, total money in, total money out and "checks," which are chips located in the player's "shoe" on the table, i.e., chips the player has but is not betting. Preferably, the supervisor, upon verification of the information, presses the appropriate key, which in a preferred embodiment is indicated by "closed rating" 22, which thereby updates the player's account with the central computer.

In a preferred embodiment, by pressing a "no rating" key 23 on the system's input, a customer will be checked out of the system, but their account will not be updated.

Figure 7:
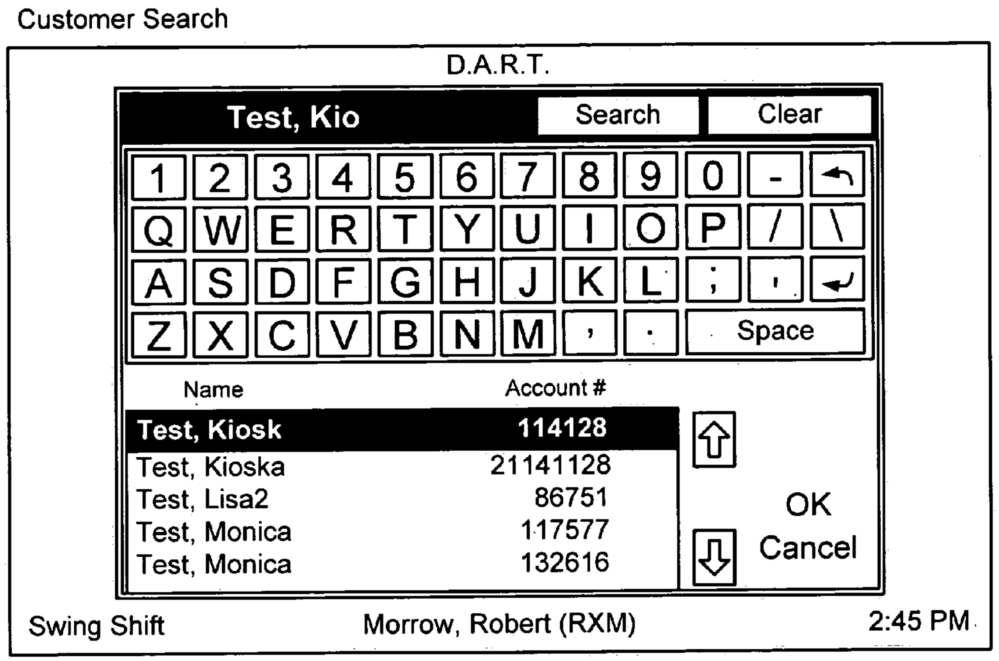
FIG. 7 is another schematic illustration of a display on a display monitor in accordance with the present invention.

A screen similar to that which is illustrated in FIG. 7 is preferably provided with the embodiment that includes a touch screen to allow for various information inputting and searching.

In one embodiment, the system may perform regulatory functions based on regulatory compliance rules. For example, the system can perform currency transaction threshold and currency buy-in tracking for players. Currency transaction threshold regulations include regulations that require recording and reporting any transactions that reach a certain threshold. For example, information for a player that reaches $10,000 in transactions should be recorded. Currency buy-in regulations include regulations that require recording the buy-in amount for players. For example, the amount of money a player buys-in for in a game should be recorded.

Different areas may have different regulatory rules. An area may be a state, country, or any other jurisdiction. For example, a state may have regulatory rules that casinos must follow. The system is configured to perform regulatory functions based on an area's regulatory compliance rules. The system includes parameters that allow a user to input a regulatory environment. For example, the regulatory compliance rules for the State of Nevada may be used.

In one embodiment, a player is associated with a player position on display monitor 20. Regulatory functions may then be performed for the player. For example, currency buy-ins and currency transaction thresholds may be tracked using the system.

Figure 8:
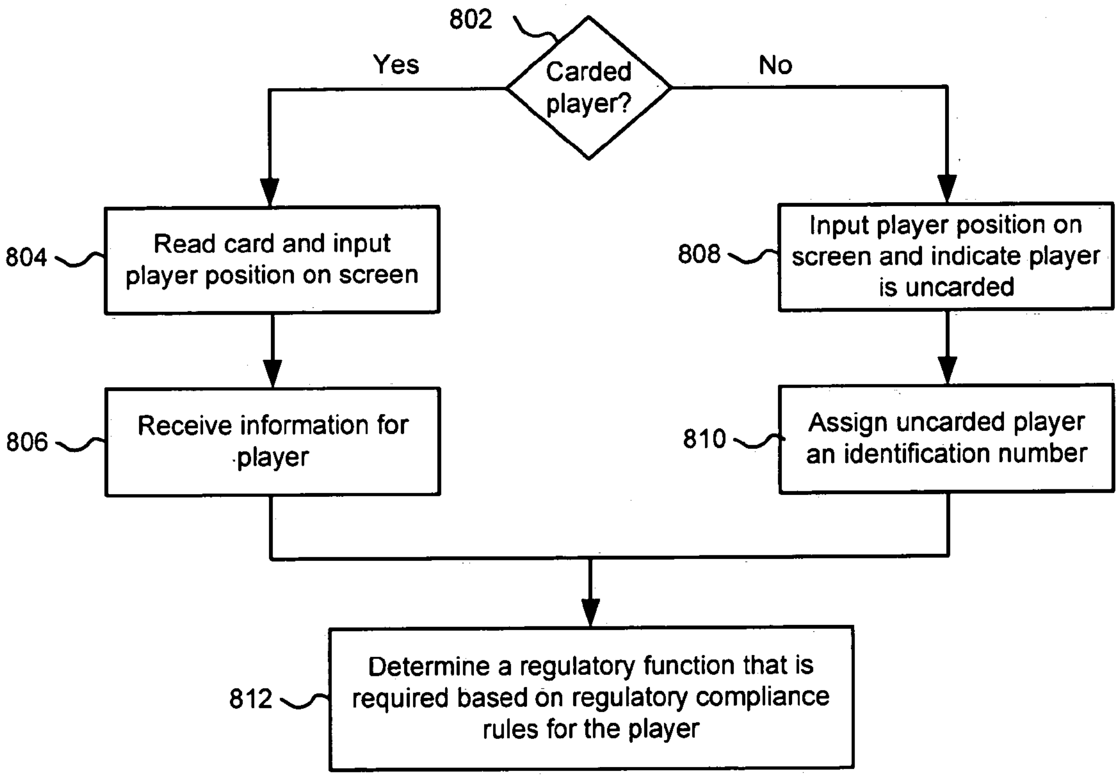
FIG. 8 depicts a simplified flowchart for determining the regulatory functions are needed according to one embodiment of the present invention.

FIG. 8 depicts a simplified flowchart 800 for determining the regulatory functions are needed according to one embodiment of the present invention. In step 802, it is determined if a player at a player position is a carded or uncarded player. For example, as described above, a player may have a card that is read by a card reader. The player is then associated with a player position on display monitor 20. Also, a player may not have a card and conventionally may not have been entered in the system. However, regulatory compliance rules may require that carded and uncarded players should be monitored during their game play.

If the player is a carded player, in step 804, a player's card is read using card reader 12 and a player position is input on display monitor 20. For example, as described above, a dealer may touch a player position 11 on display monitor 20 that corresponds to where a player is physically located at the table.

In step 806, information is received for the player. For example, information for a currency buy-in amount may be received. The currency buy-in amount may be the amount of money that is exchanged for the casino's chips. Also, any other descriptive information for the player may be received. The descriptive information may be a physical description, account number, etc.

If the player is not a carded player, in step 808, a player position 11 is inputted on display monitor 20. An input indicating that the player is an uncarded player is also received. As mentioned above, the player position may be inputted by touching player position 11 on display monitor 20 that corresponds to where the player is physically located at the table. Also, the indication that the player is an uncarded player may be input using a touch screen or may be input using other methods, such as using a key on an input device (e.g., a keyboard).

In step 810, the uncarded player is assigned an identification number. The identification number is assigned such that the information for the uncarded player may be tracked. For example, a currency buy-in may be inputted and associated with the player. In one embodiment, the identification number may be different than an identification number for a carded player. This allows the system to distinguish between carded and uncarded players.

In step 812, a regulatory function that is required based on regulatory compliance rules is determined for the player. For example, a currency buy-in or a currency transaction threshold may be tracked. Also, the regulatory compliance rules that are used may be different for different areas. For example, different states may have different regulatory compliance rules that are applied for the player.

Figure 9:
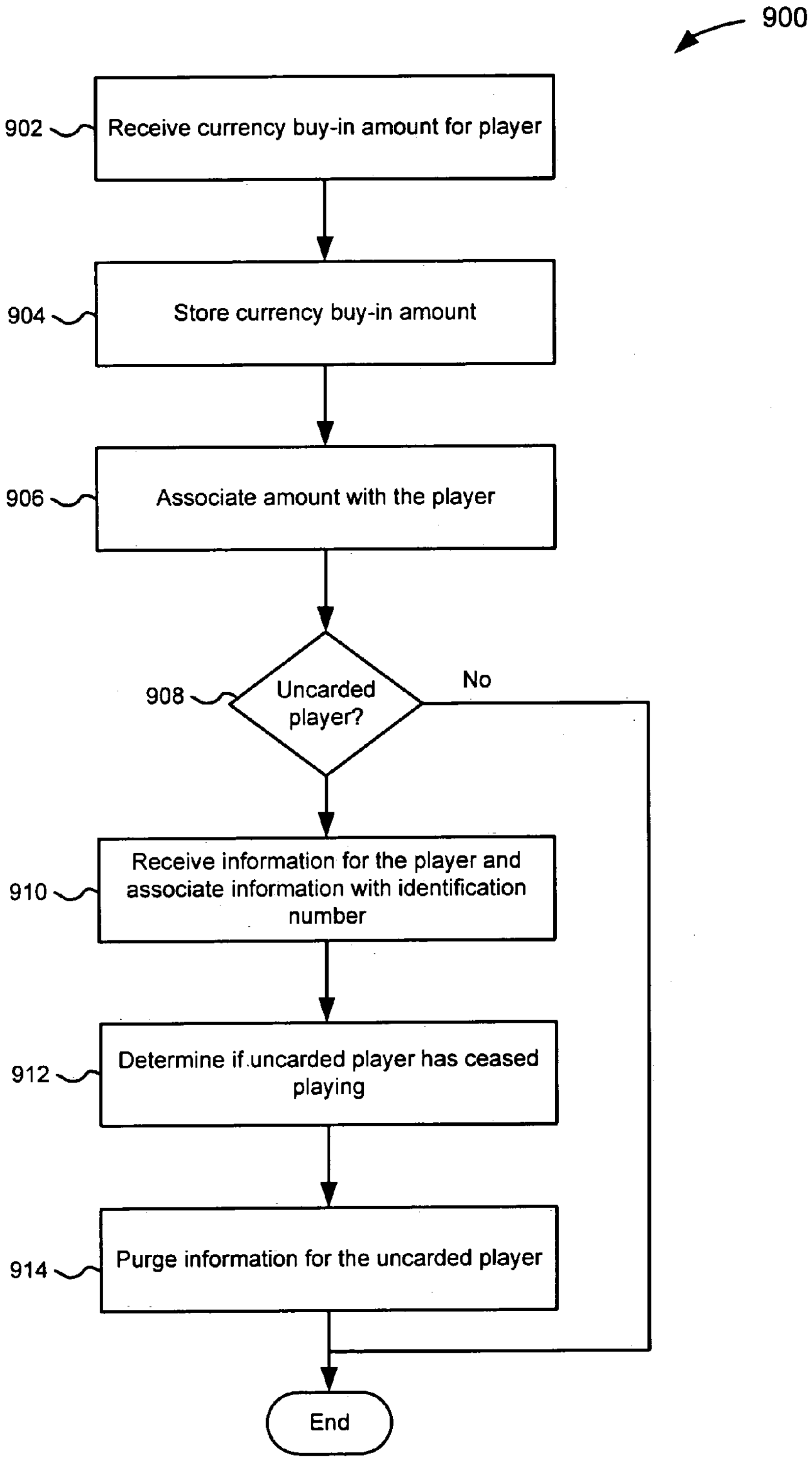
FIG. 9 depicts a simplified flowchart of a method for tracking a currency buy-in amount according to one embodiment of the present invention.

FIG. 9 depicts a simplified flowchart 900 of a method for tracking a currency buy-in amount according to one embodiment of the present invention. As mentioned above, one regulatory function that may be performed by the system includes tracking a currency buy-in amount. The currency buy-in amount may be tracked for carded and uncarded players in one embodiment.

In step 902, the currency buy-in amount for a player is tracked. For example, the amount that a player buys in for is inputted into the system. For example, a user may first start playing with $100.00. That $100.00 is the buy-in amount and that amount is inputted into the system and associated with a player position 11. The amount may be inputted into the system using a touch screen or any other input device, such as a keyboard.

In step 904, the currency buy-in amount is stored. The currency buy-in amount may be stored for a determined period of time. For example, the buy-in amount may be stored until the end of the gaming day, until a player ceases to play, for a calendar year, or indefinitely.

In step 906, the currency buy-in amount is associated with the player. For example, the currency buy-in amount may be associated with the card that has been inputted. Also, the currency buy-in amount is associated with player position 11 depicted on display monitor 20. The amount may also be displayed at player position 11 on display monitor 20.

In step 908, it is determined if the player is an uncarded player. If not, the process ends. If a player is an uncarded player, in one embodiment, the following steps may be performed.

If the player is an uncarded player, in step 910, information is received for the player and the information is associated with an identification number that is created for the uncarded player. Conventionally, the currency buy-in amount may not have been associated with a player if the player does not have a card. However, in one embodiment, the currency buy-in amount may be inputted and associated with player position 11 displayed on display monitor 20. The currency buy-in amount may also be associated with the identification number assigned to the uncarded player.

In addition to receiving the currency buy-in amount, descriptive information for the player may be received that can be used to identify the uncarded player. The descriptive information is needed in order to distinguish between uncarded players. The descriptive information may not be needed if the player is associated with a player position, however. Descriptive information may include information for gender, race, height, weight, clothing and any other distinguishing characteristics. In one embodiment, display monitor 20 may include selectable choices that can be made for gender, race, height and weight characteristics. For example, dropdown choices may allow a user to select the characteristics. The information received is then associated with the identification number that was created for the uncarded player.

In step 910, it is determined if the uncarded player has ceased playing. For example, if an uncarded player leaves a table and continues to play at another table, it does not necessarily mean the player has ceased playing. Thus, a positive indication that a player has ceased playing may be required.

In step 914, when it is determined that an uncarded player has ceased playing, the information for the uncarded player may be purged. It will be understood that information for an uncarded player may also be stored after it is determined that a player has ceased playing. For example, information may be stored and purged at the end of a gaming day even if the player has ceased playing.

Figure 10:
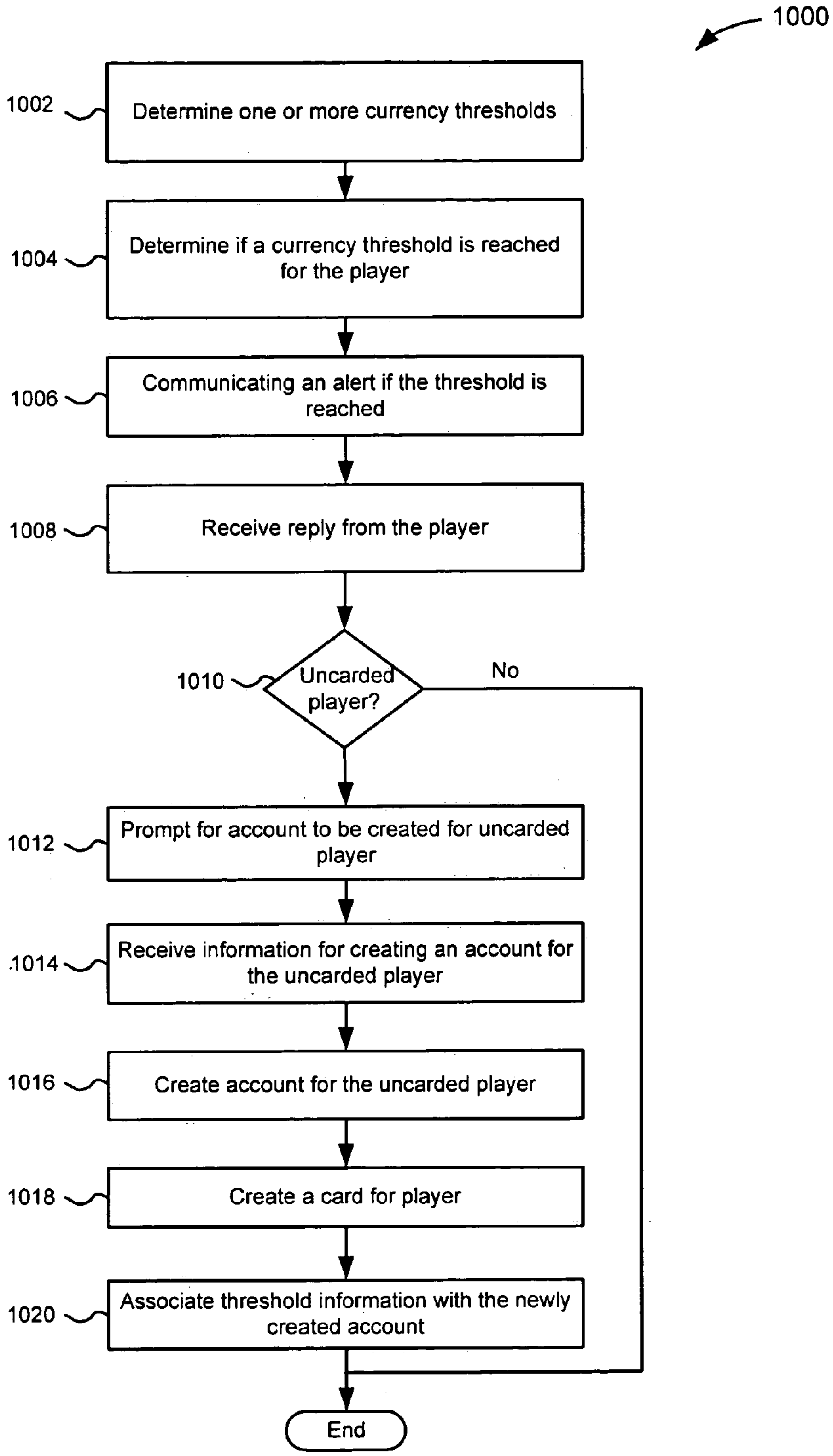
FIG. 10 depicts a simplified flowchart of a method for tracking a currency transaction threshold according to one embodiment of the present invention.

FIG. 10 depicts a simplified flowchart 1000 of a method for tracking a currency transaction threshold according to one embodiment of the present invention. In step 1002, one or more currency transaction thresholds are determined. For example, as a player is associated with a player position 11 on display monitor 20, one or more currency transaction thresholds are determined and associated with the player. In one embodiment, different currency transaction thresholds may be provided. For example, a currency transaction threshold for a single transaction, a daily currency transaction threshold for multiple transactions, and any other currency transaction thresholds for regulatory compliance rules may be associated with a player. Also, a currency transaction threshold defined by the casino or any other entity may be associated with a player. The threshold may prompt a casino operations staff member to approach and ask an uncarded player to create a marketing account for a card or prompt for any other action by the casino.

In step 1004, it is determined if a currency transaction threshold is reached for the player. For example, a currency transaction of $1,000.00 or greater may cause the threshold to be reached. Also, multiple transactions that are greater than $10,000.00 may cause the currency transaction threshold to be reached.

In step 1006, an alert is communicated if a currency transaction threshold is reached. For example, an alert may be displayed on display monitor 20 that indicates a currency transaction threshold has been reached. The alert may also be depicted with the player position 11 associated with the player. In this case, a dealer may quickly identify which player the currency transaction threshold has been reached for by looking at the player position 11 displayed. The alert may also be communicated to another system. For example, a backroom computer may receive the alert and management may choose to take an action based on the alert. Also, the alert may be displayed on a computer system for a supervisor of the table to view.

In step 1008, a reply from the player is received. For example, a player may be required to submit information because a currency transaction threshold has been reached. Regulatory compliance rules may require identification information, such as a social security number, driver's license number, for the player. Also, the player may need to acknowledge that he/she is aware that the currency transaction threshold has been reached. When the reply is received from the player, the reply may be stored and associated with the player.

The process may then end if the player is a carded player. However, in step 1010, if the player is uncarded, the following steps may be performed.

If the player does not have a card, in step 1012, a prompt is displayed that indicates an account should be created for the uncarded player. The prompt would indicate that a casino operations person should approach the player to request that an account should be created. The account is created because regulations may require that a person's social security number and other information may be required if a certain amount (e.g., $10,000) is wagered. The account is created with the person's information that is required by the regulations. In one example, a marketing account for the player may be created.

In step 1014, information for creating an account for the uncarded player is received. The information may include the player's name, date of birth and gender. Additionally, an address, telephone, email address and social security number may also be received. The information may be input using display monitor 20 and may also be associated with a player position 11 depicted. In another embodiment, another system may be used to input the information.

In step 1016, an account from the uncarded player is created. The account is created and may then be associated with the player position 11 depicted on display monitor 20.

In step 1018, a card for the player may be created. For example, a card may be created by casino personnel and brought to the player. Also, the system may create the card with the received information.

In step 1020, the currency transaction threshold information is associated with newly created account. For example, the information that was associated with the temporary identification number for the uncarded player is transferred to the newly created account. The information may also be associated with the player position depicted on display monitor 20.

Figure 11:
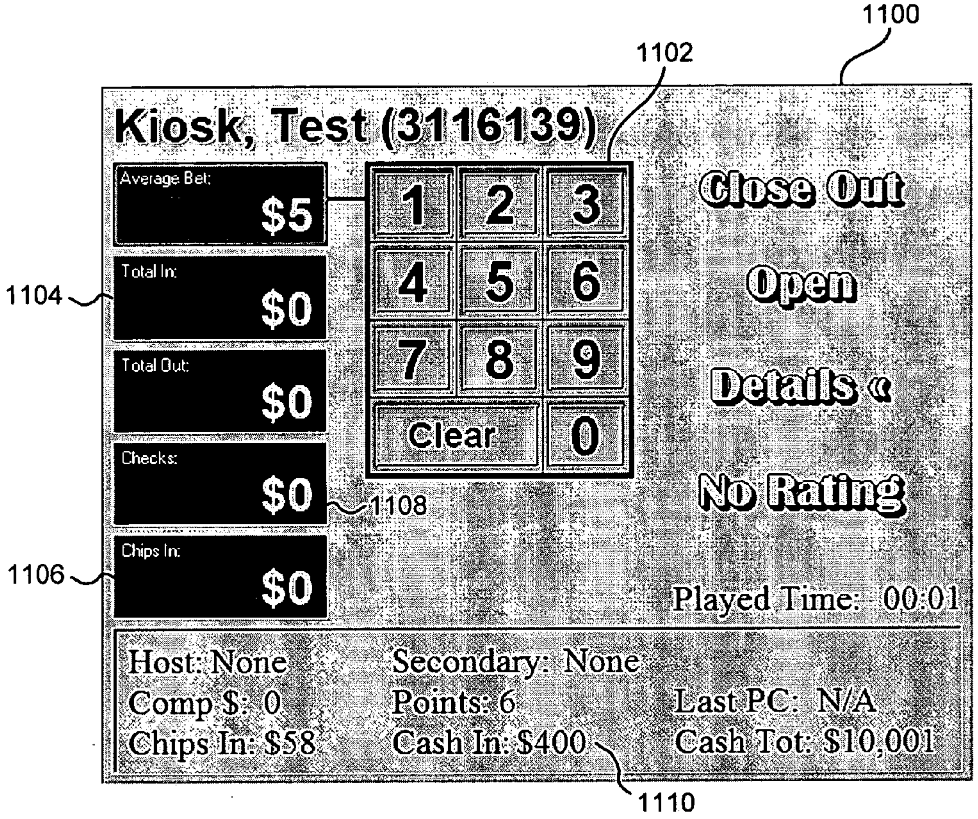
FIG. 11 depicts an interface that may be used to record a currency buy-in according to one embodiment of the present invention.

FIG. 11 depicts an interface 1100 that may be used to record a currency buy-in according to one embodiment of the present invention. In one embodiment, interface 1100 is displayed on display monitor 20.

When a buy-in amount is received, a user may select a player position 11 to associate a player position with a player. The user may then enter a currency buy-in amount using input device 1102. As shown, input device 1102 is a display of a keyboard on display monitor 20. The keys depicted may be selected using a touchscreen. Although input device 1102 is shown, it will be understood that other input devices may be used, such as a keyboard, voice recognition software, etc.

When the currency buy-in amount is entered, it is displayed in a total in display 1104. Also, the breakdown of the buy-in amount may be shown. For example, an amount of chips that were received may be displayed in a chip in display 1106; an amount of checks may be displayed in a checks display 1108; and an amount of cash received may be displayed in a cash in display 1110.

Figure 12:
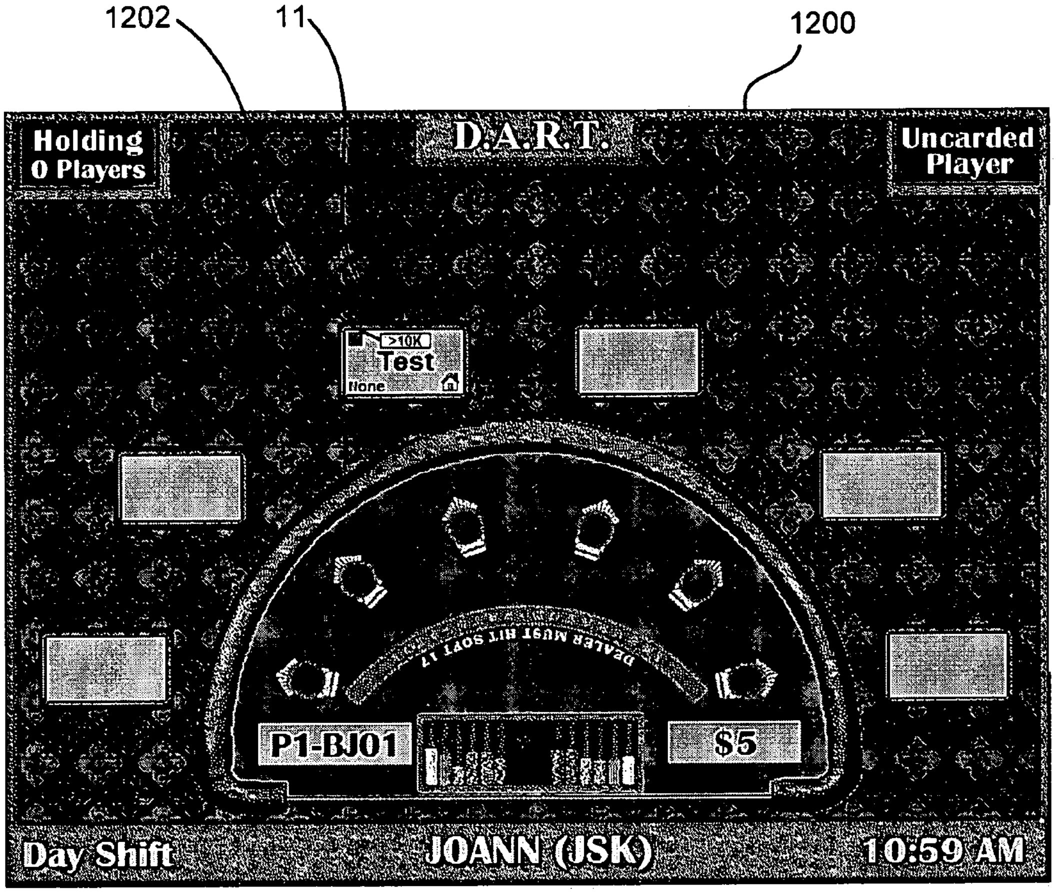
FIG. 12 depicts an interface that shows a currency transaction threshold that is associated with a player position according to one embodiment of the present invention.

FIG. 12 depicts an interface 1200 that shows a currency transaction threshold that is associated with a player position 11 according to one embodiment of the present invention. As shown, a currency transaction threshold 1202 has been entered and associated with player position 11. Because currency transaction threshold 1202 is depicted at player position 11, a user may easily associate a currency transaction threshold with a player physically located at the player position of the table.

Accordingly, embodiments of the present invention allow regulatory functions associated with regulatory compliance rules to be performed. The regulatory functions allow a system to comply with different regulatory environments. For example, currency buy-ins and currency transaction thresholds may be tracked depending on regulatory compliance rules. Accordingly, the system may be used to comply with these rules.

Although the invention has been described with reference to specific exemplary embodiments, it will be appreciated that it is intended to cover all modifications and equivalents within the scope of the appended claims.

What is claimed is:

1. A method of tracking players at a gaming table that includes a plurality of player positions, the method comprising:

receiving a card from a player at one of the player positions;

reading player information from the card with a card reader;

depicting the player positions of the gaming table on a display;

associating a respective player position of the player on the display with the card by touching the respective player position depicted on the display, the respective player position being a position at which the player is located at the gaming table;

determining a regulatory function that is required based on regulatory compliance rules for the player; and displaying information for the regulatory function at the respective player position of the player depicted on the display.

2. The method of claim 1, wherein the regulatory function comprises a currency buy-in regulation.

3. The method of claim 2, wherein determining the regulatory function comprises:

tracking a currency buy-in amount for the player; and storing the currency buy-in amount.

4. The method of claim 1, wherein the regulatory function comprises a currency transaction threshold regulation.

5. The method of claim 4, further comprising receiving a designation of a currency transaction threshold.

6. The method of claim 5, wherein the currency transaction threshold comprises a currency transaction threshold for a single transaction or a currency transaction threshold for one or more transactions in a time period.

7. The method of claim 5, further comprising communicating an alert if the currency transaction threshold is reached by the player.

8. The method of claim 7, further comprising receiving a reply for the communicated alert from the player.

9. The method of claim 8, wherein the reply includes information for the player.

10. The method of claim 8, wherein the reply includes an acknowledgment from the player that the alert has been communicated to the player.

11. A system for tracking play on a gaming table that includes a plurality of player positions, the system comprising:

a computer database;

a card reader, the card reader being coupled to the computer database with a communication channel; and a display monitor, the display monitor being coupled to the computer database with the communication channel, the display monitor being configured to depict player positions where players are physically positioned at the table, wherein the display monitor comprises a touchscreen for associating a card of a player being read by the card reader with a respective player position of the player at the table upon a touching of the respective player position depicted on the touchscreen, the respective player position depicted by the display monitor indicating the player associated with the card read by the card reader; and a regulatory module configured to perform a regulatory function for the player that is associated with the card based on regulatory compliance rules, wherein the display monitor is configured to display information for the regulatory function at the respective player position of the player depicted on the touch-screen.

12. The system of claim 11, wherein the regulatory function comprises a currency buy-in regulation.

13. The system of claim 12, wherein the regulatory module is configured to:

track a currency buy-in amount for the player; and store the currency buy-in amount.

14. The system of claim 11, wherein the regulatory function comprises currency transaction threshold regulation.

15. The system of claim 14, wherein the regulatory module is configured to receive a designation of a currency transaction threshold.

16. The system of claim 14, wherein the currency transaction threshold comprises a currency transaction threshold for a single transaction or a currency transaction threshold for one or more transactions in a time period.

17. The system of claim 14, wherein the regulatory module is configured to communicate an alert if the currency transaction threshold is reached by the player.

18. The system of claim 17, wherein the regulatory module is configured to receive a reply for the communicated alert from the player.

19. The system of claim 18, wherein the reply includes information for the player.

20. The system of claim 19, wherein the reply includes an acknowledgment from the player that the alert has been communicated to the player.

21. A method of tracking players at a gaming table that includes a plurality of player positions, the method comprising:

receiving a card from a player at one of the player positions;

reading player information from the card with a card reader;

depicting the player positions of the gaming table on a display;

associating a respective player position of the player on the display with the card by touching the respective player position depicted on the display at which the player is located at the gaming table;

determining a regulatory function that is required based on regulatory compliance rules for the player in response to the touching of the respective player position depicted on the display; and displaying information for the regulatory function at the respective player position of the player depicted on the display.

* * * * *